United States Patent
Sasaki et al.

(10) Patent No.: US 8,568,503 B2
(45) Date of Patent: Oct. 29, 2013

(54) VENT FILTER AND ELECTRIC DEVICE USING THE SAME

(75) Inventors: Yutaka Sasaki, Tokyo (JP); Yusuke Yahara, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 66 days.

(21) Appl. No.: 13/254,246

(22) PCT Filed: Feb. 26, 2010

(86) PCT No.: PCT/JP2010/053130
§ 371 (c)(1), (2), (4) Date: Oct. 31, 2011

(87) PCT Pub. No.: WO2010/101093
PCT Pub. Date: Sep. 10, 2010

(65) Prior Publication Data
US 2012/0060693 A1    Mar. 15, 2012

(30) Foreign Application Priority Data

Mar. 6, 2009    (JP) .................................. 2009-53911

(51) Int. Cl.
*B01D 53/04*    (2006.01)
*G11B 33/14*    (2006.01)

(52) U.S. Cl.
USPC .................. 55/385.6; 55/385.4; 55/DIG. 39; 96/4; 96/13; 96/131; 96/134; 96/135; 96/139; 96/152; 96/153; 96/154; 360/97.02; 360/97.03; 360/97.04

(58) Field of Classification Search
USPC ....... 55/385.6, 385.4, DIG. 39; 96/4, 13, 131, 96/134, 135, 139, 152, 153, 154; 360/97.02, 97.03, 97.04
See application file for complete search history.

(56) References Cited

U.S. PATENT DOCUMENTS

| | | | | |
|---|---|---|---|---|
| 5,417,743 A * | 5/1995 | Dauber | ............................. | 96/13 |
| 5,997,614 A * | 12/1999 | Tuma et al. | ......................... | 96/4 |
| 6,395,073 B1 * | 5/2002 | Dauber | ............................ | 96/134 |
| 6,712,887 B2 * | 3/2004 | Ueki et al. | ...................... | 96/134 |
| 7,291,208 B2 * | 11/2007 | Dauber et al. | .................. | 96/134 |
| 7,306,659 B2 * | 12/2007 | Gorton et al. | ................... | 96/134 |

FOREIGN PATENT DOCUMENTS

| | | |
|---|---|---|
| JP | 7-211055 | 8/1995 |
| JP | 11-238376 | 8/1999 |
| JP | 2000-33212 | 2/2000 |
| JP | 2003-507835 | 2/2003 |

(Continued)

OTHER PUBLICATIONS

International Search Report from PCT/JP2010/053130 (2 pages).

*Primary Examiner* — Robert Clemente
*Assistant Examiner* — Minh-Chau Pham
(74) *Attorney, Agent, or Firm* — Amy L. Miller (57) ABSTRACT

It is an object to provide a vent filer that can reduce contaminants diffusing through the vent filter into the inside of a housing, and has high diffusion efficiency and low pressure loss. The vent filter has an adhesive layer 1 having a through-hole 1a at least in one area; a flow path member 2 provided with a flow path 2a in communication with the through-hole 1a; and an air-permeable membrane 3 covering the flow path member 2 and part of the adhesive layer 1, wherein the peripheral portion 3a of the air-permeable membrane 3 is fixed to the adhesive layer 1 and the flow path member 2 is held within a hollow portion formed between the adhesive layer 1 and the air-permeable membrane 3.

19 Claims, 4 Drawing Sheets

(56) References Cited

FOREIGN PATENT DOCUMENTS

| JP | 2003-71230 | 3/2003 |
| JP | 2003-510169 | 3/2003 |
| JP | 2007-201110 | 8/2007 |
| JP | 2008-509808 | 4/2008 |
| JP | 2008-509809 | 4/2008 |

* cited by examiner

VENT FILTER AND ELECTRIC DEVICE USING THE SAME

TECHNICAL FIELD

The present invention relates to a vent filter and an electric device using the same, and more specifically, it relates to a vent filter used by being mounted over an opening for housing ventilation in an electric device such as a hard disk drive.

BACKGROUND ART

A housing of an electronic device and a container for storing or transporting chemical substances such as chemicals are provided with a ventilation opening for reducing the atmospheric pressure (internal pressure) within the housing (container). A vent filter is provided at the ventilation opening so as to block contaminants that may enter from the outside, such as dust and water droplets. As one of such vent filters, there has been known a vent filter for hard disk drives (HDDs).

The vent filter requires the function of preventing contaminants present outside the housing from entering the housing, and particularly the HDD requires very high air cleanliness. For this reason, the vent filter needs to suppress the dust and the gas generated from the vent filter itself to low levels.

Currently available vent filters have the function of inhibiting not only dust but also gaseous contaminants from entering. For example, Patent Document 1 discloses a filter assembly including: a plastic housing having a gas passage therein; and a filter sheet (air-permeable membrane) capable of adsorbing gaseous contaminants. The gas passage in the plastic housing allows gas distribution between the breather opening (ventilation opening) and the air-permeable membrane.

In addition, Patent Document 2 discloses a vent filter having a layered structure of a double-sided pressure-sensitive adhesive tape, a gas adsorbent, and an air-permeable membrane. The vent filter has a diffusion flow path (gas passage) therein, and thereby has the same function as that of the vent filter of Patent Document 1. Patent Document 2 takes an example of the use of a porous PTFE membrane as an air-permeable material. In various plastics, PTFE is a material having the least amounts of dust and gas generation, because PTFE has high heat resistance and does not melt even at high temperatures.

PRIOR ART DOCUMENTS

Patent Document

Patent Document 1: Japanese Patent Laid-open Publication No. 7-211055 (e.g., FIG. 2)

Patent Document 2: Japanese Patent Publication No. 3313725 (e.g., FIG. 2A)

SUMMARY OF THE INVENTION

Problems to be Solved by the Invention

However, in the vent filter disclosed in Patent Document 1, the air-permeable membrane and the plastic housing are attached by thermal fusion bonding or ultrasonic welding. Accordingly, weld flash generated during the attachment and dust generated from the thermal degradation of plastics may become contamination sources, and therefore, the air cleanliness within the HDD will be decreased. Further, weld flash and cutting debris, which are generated during molding, are attached to the plastic housing, which occupies a large portion of the surface of the filter assembly.

Meanwhile, in the vent filter disclosed in Patent Document 2, the diffusion flow path is formed by punching an opening shape in a thin double-sided pressure-sensitive adhesive tape. This makes it difficult to lengthen or complicate the diffusion flow path. Further, the cross-sectional area of the diffusion flow path is limited by the thickness of the double-sided pressure-sensitive adhesive tape to be used, and therefore, it is not possible to obtain a sufficient flow rate of gas. That is, the structure of the vent filter disclosed in Patent Document 2 leads to a low diffusion efficiency of the distributed gas and a high pressure loss in the vent filter.

The present invention has been completed under the above circumstances, and it is an object of the present invention to provide a vent filter that can reduce contaminants diffusing through the vent filter into a housing or the like, and has high diffusion efficiency and low pressure loss.

Means of Solving the Problems

The vent filter of the present invention, which can attain the above object, comprises: an adhesive layer having a through-hole at least in one area; a path flow member provided with a path flow in communication with the through-hole; and a air-permeable membrane covering the flow path and part of the adhesive layer, wherein a peripheral portion of the air-permeable membrane is fixed to the adhesive layer and the flow path member is held within a hollow portion formed between the adhesive layer and the air-permeable membrane.

In the above vent filter, the flow path member may desirably be a plastic formed product.

In the above vent filter, a groove may desirably be formed on a first main surface of the flow path member, which surface is opposite to the adhesive layer, and the groove may desirably serve as a path flow of the path flow member.

In the above vent filter, a gas adsorbent member may desirably be formed between the flow path member and the air-permeable membrane.

In the above vent filer, a concave portion and/or a convex portion may desirably be formed on a second main surface of the flow path member, which surface is opposite to the gas adsorbent member.

In the above vent filter, a concave portion and/or a convex portion may desirably be formed on a first main surface of the gas adsorbent member, which surface is opposite to the path flow member.

In the above vent filter, a ventilation member may desirably be sandwiched between the gas adsorbent member and the flow path member. Further, the peripheral portion of the ventilation member may desirably be sandwiched between the air-permeable membrane and the adhesive layer in the peripheral portion of the air-permeable membrane.

In the above vent filter, a barrier layer may desirably be formed between the gas adsorbent member and the air-permeable membrane.

In the above vent filter, a gas adsorbent member may desirably be further formed between the barrier layer and the air-permeable membrane.

In the above vent filter, a catching part may desirably be formed in the flow path member and/or the gas adsorbent member.

In the above vent filter, the air-permeable membrane may desirably comprise a fluororesin membrane and may more preferably comprise an expanded porous polytetrafluoroethylene membrane.

In the above vent filter, a liquid repellant agent may desirably be added to a surface of the air-permeable membrane.

In the above vent filter, the adhesive layer may desirably comprise a double-sided pressure-sensitive adhesive tape.

In the above vent filter, the area for attachment of the peripheral portion of the air-permeable membrane to the adhesive layer may desirably be not smaller than 0.15 times and not greater than 0.8 times, the bottom area of the vent filter.

In the above vent filer, the flow path member may desirably have a thickness of from 0.3 to 5 mm.

In the above vent filter, a space may desirably be formed between the flow path member and the gas adsorbent member and the space may desirably have a volume of not smaller than 0.02 mm$^3$ per 1 mm$^3$ in area of the main surface of the flow path member.

The electric device of the present invention, which can attain the above object, comprises: a housing having an opening; and the above vent filter formed so as to cover the opening.

Effects of the Invention

According to the vent filter of the present invention, the flow path member is held within the hollow portion formed between the adhesive layer and the air-permeable membrane, and therefore, contaminants generated from the flow path member cannot diffuse through the vent filter. Further, the shape and the material of the flow path member are not particularly limited, and this increases the degree of freedom for designing the flow path. This makes it possible to form a vent filter having high diffusion efficiency, and also possible to form a vent filter having both high diffusion efficiency and low pressure loss, depending on the design.

In addition, the portion (hereinafter referred to as the "flange") which is the peripheral portion of the air-permeable membrane and at which the adhesive layer and the air-permeable membrane are fixed together is, even with the strength of the adhesive layer, thinner and more flexible than the portion holding the flow path member, and therefore, has an excellent adhesion to a housing to which the vent filter is mounted. Thus, even when some undulation or deformation occurs in the housing, the flange deforms along the housing. This makes gas unlikely to leak.

In addition, when a release film is used, which is adhered to the adhesive layer for the purpose of, for example, storing or transporting the vent filter, even if bending occurs in the release film, the flange bends in accordance with the bending of the release film. This improves the adhesion to the release film, and makes the vent filter unlikely to be removed or shifted from the release film.

MODE FOR CARRYING OUT THE INVENTION

The vent filter in Embodiments of the present invention and an electric device using the same will be described below in detail by reference to the drawings. As an example of the electric device, a hard disk drive (HDD) is used.

(Embodiment 1)

Figure 1:
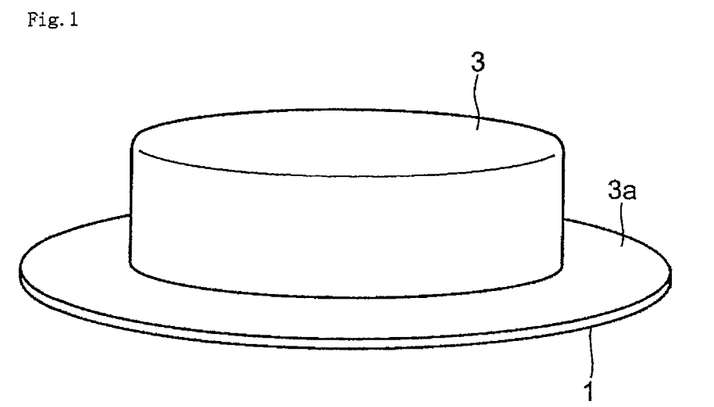
FIG. 1 is an upper perspective view of a vent filter according to Embodiment 1 of the present invention.
Figure 2:
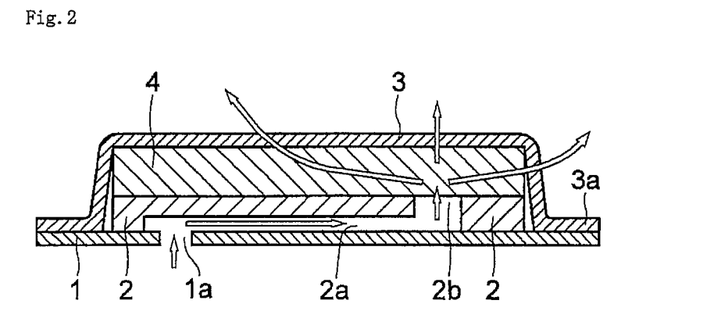
FIG. 2 is a cross-sectional view of the vent filter.
Figure 3:
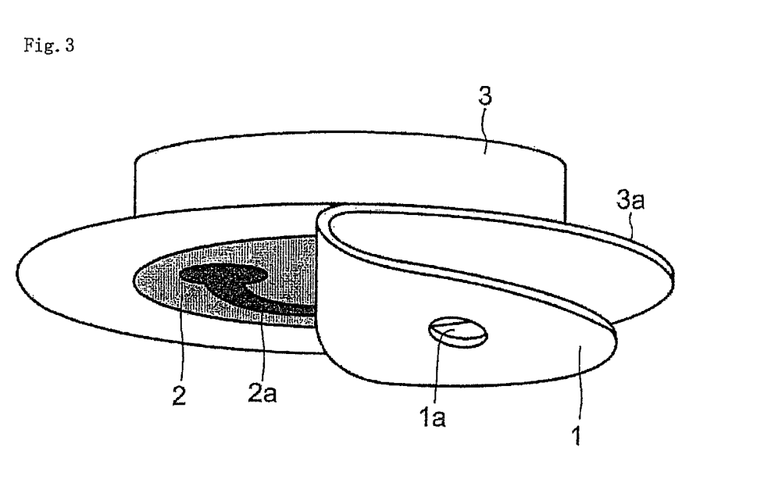
FIG. 3 is a lower perspective view of the vent filter.

FIGS. 1 to 3 are views explaining the structure of a vent filter according to an Embodiment of the present invention. More specifically, FIG. 1 is an upper perspective view of the vent filter according to the present Embodiment; FIG. 2 is a cross-sectional view; and FIG. 3 is a lower perspective view. As shown in FIGS. 1 to 3, the vent filter comprises: an adhesive layer 1 having a through-hole 1a at least in one area; a flow path member 2 having a flow path 2a in communication with the through-hole 1a; and an air-permeable membrane 3 covering the flow path member 2 and part of the adhesive layer 1. The peripheral portion (flange) 3a of the air-permeable membrane 3 is fixed to the adhesive layer 1. The flow path member 2 is held within a hollow portion formed between the adhesive layer 1 and the air-permeable membrane 3, and a gas adsorbent member 4 is formed between the flow path member 2 and the air-permeable membrane 3.

Figure 4:
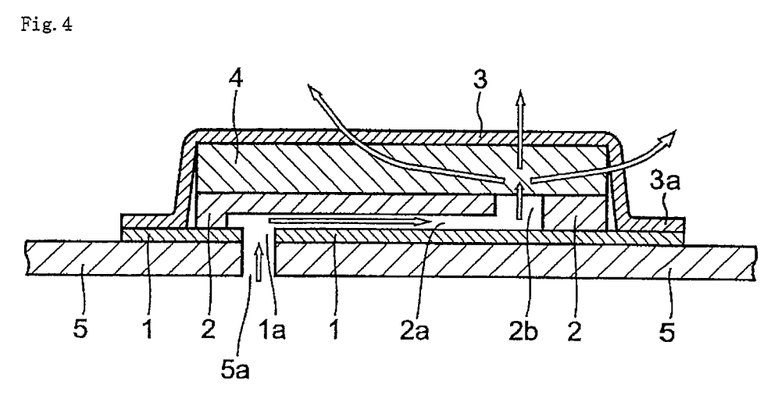
FIG. 4 is a cross-sectional view of the vent filter according to Embodiment 1 of the present invention.

FIG. 4 is a cross-sectional view showing the state where the vent filter shown in FIGS. 1 to 3 is attached to an inner wall of a housing 5 of an HDD. The housing 5 is provided with an opening 5a. The presence of the opening 5a makes it possible to form a structure that, even when the air within the housing 5 has expanded and contracted, allows the air to enter and exit from the housing through the opening 5a and the vent filter (the through-hole 1a, the flow path 2a in the flow path member 2, and an opening 2b). This achieves the breathing of the HDD housing 5 while maintaining high cleanliness within the HDD housing 5. For example, even when the air within the HDD housing 5 has contracted by rapidly bringing the HDD housing 5 into a low-temperature environment, air from which contaminants are removed by the vent filter is supplied into the HDD housing 5, and high cleanliness within the HDD housing 5 is maintained without deforming the HDD housing 5. Further, when the HDD housing 5 is used in a humid environment for a long period of time, the flow path member 2 inhibits moisture from entering the HDD housing 5. This prevents condensation within the HDD, and therefore, prevents the generation of rust.

Then, the flow of gas passing through the opening 5a of the housing 5 will be described. In FIG. 4, the gas having entered the housing 5 from the outside of the housing 5 (the lower side in FIG. 4) through the opening 5a of the housing 5 flows into the vent filter through the through-hole 1a of the adhesive layer 1, passes through the flow path 2a, and flows to the opening 2b. From the opening 2b, the gas passes to the inside of the housing 5 (the upper side of FIG. 1) through the gas adsorbent member 4 and the air-permeable membrane 3. The gas can also flow in the direction opposite to the above, and therefore, passes through the flow path 2a from the air-permeable membrane 3 side and exits to the outside through the opening 5a of the housing 5.

The vent filter in the present Embodiment holds (seals) the flow path member 2 in the hollow portion formed between the adhesive layer 1 and the air-permeable membrane 3. This makes it possible to collect the dust generated from the flow path member 2, and carry out gas filtration (filtering) to obtain high cleanliness. Further, the shape of the flow path member 2 and the material to be used for the flow path member 2 are not particularly limited. This makes it possible to achieve high diffusion efficiency by designing the flow path 2a to be long, and also achieve low pressure loss by setting the cross-sectional area of the flow path 2a to be large. If a plastic formed product is used for the flow path member 2, it is possible to further increase the degree of freedom for designing the flow path 2a. This makes it possible to achieve both high diffusion efficiency and low pressure loss.

In addition, even with the strength of the adhesive layer 1, the flange 3a is thinner and more flexible than the portion holding the flow path member 2, and therefore, the vent filter has an excellent adhesion to the housing 5 at the flange 3a. That is, even when the housing 5 is deformed by the application of some external stress to the housing 5, the flange 3a follows the deformation of the housing. This makes the flange 3a unlikely to come off and also peel from the housing 5. This effectively prevents gas from flowing (leaking) into and out of the housing 5 without passing through the air-permeable membrane 3.

To exhibit the above functions, the vent filter of the present invention comprises, as necessary components, the adhesive layer 1, the flow path member 2, and the air-permeable membrane 3. The gas adsorbent member 4, however, may be provided depending on the circumstances, in accordance with the need to adsorb and remove hazardous gas. The component members in the present Embodiment will be described below in detail.

(1) Adhesive Layer

The adhesive layer 1 is an adhesive sheet-like product, and is obtained by, for example, providing an adhesive on a flexible base sheet. In the present invention, an adhesive refers to a substance in general that is used to adhere objects together, and includes one termed a pressure-sensitive adhesive. As the adhesive (pressure-sensitive adhesive), there may appropriately be used heretofore known adhesives, such as acrylic adhesives, silicone adhesives, and rubber adhesives. Acrylic adhesives may preferably be used because of their excellent heat resistance and low gas generation properties. The heat resistance temperature of the adhesive (the temperature at which the adhesiveness to a product to be adhered can be maintained) may be, for example, not lower than 80° C., preferably not lower than 120° C. If the heat resistance temperature is lower than 80° C., the flow path member 2 or the air-permeable membrane 3 may peel by a thermal load during use.

(2) Flow Path Member

The flow path member 2 is, as described above, a member having the flow path 2a that allows gas to diffuse. The material of the flow path member 2 may preferably have small gas generation and low gas and moisture permeability, and may appropriately be selected depending on the application and the purpose. Preferred examples of the material of the flow path member 2 may include polycarbonate, polypropylene, polyester, nylon, acrylic polymer, polyacetal, liquid crystal polymer, ABS resin, polystyrene, polyphenylene sulfide, polyether ether ketone, polyurethane, epoxy resin, unsaturated polyester resin, synthetic rubber, and thermoplastic elastomer, and thermoplastic may particularly be preferred. The method of forming a plastic may appropriately be selected from methods including injection forming, cast molding, compression forming, and cutting work. In these methods, injection forming may most preferably be used because of its excellent working accuracy and excellent mass productivity. The thickness of the flow path member 2 may appropriately be set depending on the required air permeability and the required diffusion resistance. If the thickness is too thin, the air permeability resistance increases. If the thickness is too thick, the assembly workability and the cost are affected. Thus, the thickness of the flow path member 2 may preferably be set to be from 0.3 to 5 mm.

The flow path 2a may be a hole provided within the flow path member 2, or may be a passage (i.e., groove) exposed on the surface of the flow path member 2. For example, if a method is used of forming a flow path space between the flow path member 2 and the adhesive layer 1 by providing a groove on a first main surface of the flow path member 2, which surface is opposite to the adhesive layer 1, there is an advantage in production that the flow path 2a can be formed only by forming a groove in the flow path member 2. The shape of the flow path 2a may be linear, curved, whorled, spiral, and in other forms. The length of the flow path 2a may desirably be not smaller than 5 mm (preferably not smaller than 10 mm), in order to increase diffusion efficiency. The total volume of the flow path 2a may desirably be, for example, not smaller than 0.45 mm$^3$ (preferably not smaller than 0.9 mm$^3$), in order to reduce a pressure loss in the vent filter.

(3) Air-Permeable Membrane

The air-permeable membrane 3 is an air-permeable membrane-like product, and the air-permeable membrane 3 may desirably have air permeability, collection efficiency, and cleanness, all of which are suitable for the usage environment. For the air-permeable membrane 3, there can be used a porous resin film, an electret nonwoven fabric, or a nanofiber nonwoven fabric. As the material of the air-permeable membrane 3, there can he used polyethylene, polypropylene, polystyrene, or polyimide, and it is recommended that a film formed of preferably a fluororesin having high waterproofness, more preferably porous polytetrafluoroethylene (PTFE), should be used. A thin membrane obtained by laminating a porous PTFE film with another air-permeable material may preferably be used in view of reinforcement. The microscopic shape of the air-permeable membrane 3 may be a net shape, a mesh shape, or a porous shape. A porous PTFE film is highly waterproof, and therefore, is suitable for use in applications where air permeability is provided between the inside and outside of the HDD while water droplets, dust, hazardous gas, and others are prevented from entering the HDD.

As the porous PTFE film, there can be used an expanded porous PTFE film. The expanded porous PTFE film is obtained by mixing PTFE fine powder with a forming aid to give a paste, forming the paste into a formed product, removing the forming aid from the formed product, and then expanding the formed product at a high temperature and a high rate, and further, if necessary, baking the expanded product. In the case of uniaxially expanding, nodes (folded crystals) are arranged in a thin-island manner perpendicularly to the expanding direction, and fibrils (linear molecule bundles in which folded crystals have been unraveled and pulled out by the expanding) are oriented in a reed-screen manner along the expanding direction so as to connect the nodes to one another, resulting in a fibrous structure in which pore are formed of spaces defined by the fibrils or by both the fibrils and the nodes. In the case of biaxially expanding, fibrils are extended in a radial manner, and fibril-connecting nodes are interspersed in an island manner, resulting in a spider's web-like fibrous structure in which there are many spaces defined by both the fibrils and the nodes.

The air-permeable membrane 3 may be a uniaxially expanded porous PTFE film or a biaxially expanded porous PTFE film.

When the air-permeable membrane 3 is used, the surfaces inside the pores of the air-permeable membrane 3 may preferably be coated with a liquid-repellent polymer. When the surfaces inside the pores of the air-permeable membrane 3 have been coated in advance with a water/oil-repellent polymer, it is possible to inhibit various contaminants, such as body oils, machine oils, and water droplets, from penetrating into, or being held in, the pores of the air-permeable membrane. The contaminants reduce the collection properties and the air permeability of the air-permeable membrane, and result in deteriorating the functions of the air-permeable membrane.

In this connection, the "liquid-repellent agent" as used in the claims and the specification refers to a substance having the property or the function of repelling a liquid, and examples of the "liquid-repellent agent" may include a "water-repellent agent", an "oil-repellent agent", and a "water/oil-repellent agent." The following description will be given taking a water/oil-repellent polymer as an example.

As the water/oil-repellent polymer, there can be used polymers having fluorine-containing side chains. The water/oil-repellent polymer and a method of forming a composite of the water/oil-repellent polymer and a porous PTFE film are disclosed in detail, for example, in WO 94/22928. One example of this is shown below.

As the water/oil-repellent polymer, there may preferably be used a polymer having fluorine-containing side chains (of which fluorinated alkyl moiety may preferably have from 4 to 16 carbon atoms), which is obtained by polymerizing a fluoroalkyl acrylate and/or a fluoroalkyl methacrylate represented by the following general formula (1):

[Chemical Formula 1]

(1)

wherein n is an integer of from 3 to 13 and R is hydrogen or a methyl group. To coat the inside of the pores of the porous PTFE film with this polymer, an aqueous micro-emulsion of the polymer (having an average particle diameter of from 0.01 to 0.5 μm) is produced using a fluorinated surfactant (e.g., ammonium perfluorooctanoate); the inside of the pores of the porous PTFE film is impregnated with the aqueous micro-emulsion; and then, the resulting product is heated. As a result of the heating, the water and the fluorinated surfactant are removed, and the polymer having fluorine-containing side chains melts, and coats the surfaces inside the pores of the porous PTFE film so that continuous pores are maintained. Thus, an air-permeable membrane having high water repellency and high oil repellency is obtained.

In the above description, the shape of the air-permeable membrane 3 is circular in the present Embodiment. Alternatively, it is possible to employ not only a circular shape but also a rectangular shape, an elliptical shape, and various other shapes depending on the shape of the flow path member 2 or the gas adsorbent member 4. The area for attachment between the peripheral portion of the air-permeable membrane 3 and the adhesive layer 1 (the area of the flange 3a) is not particularly limited. To prevent gas from leaking, the area for attachment may desirably be secured to be not smaller than 0.15 times (preferably not smaller than 0.3 times) the bottom area of the vent filter. On the other hand, from the viewpoint of designing the vent filter to be as compact as possible and also from the viewpoint of ease of handling, the area of the flange 3a may desirably be set to be not greater than 0.8 times (preferably not greater than 0.6 times) the bottom area of the vent filter.

(4) Gas Adsorbent Member

The gas adsorbent member 4 is, as described above, not an essential component in the present invention, but is provided depending on the circumstances, in accordance with the need to adsorb and remove hazardous gas. A gas adsorbent used for the gas adsorbent member 4 may be, for example, activated carbon, silica gel, or an ion exchange resin. Activated carbon may be suitable for adsorbing an organic gas. If activated carbon is impregnated with an alkaline component or an acid component, the property of adsorbing an inorganic gas is also added thereto. Thus, these components may appropriately be used.

The shape of the gas adsorbent member 4 may preferably be sheet-like or tablet-like, from the viewpoint of workability and handling properties. When the bottom surface and the top surface of the flow path member 2 are formed to be small, the bottom surface of the gas adsorbent member 4 is also formed to be small, and is accordingly formed to be thick so as to compensate for the small formation, in order to secure the ability to adsorb and remove a hazardous gas.

The vent filter of the present invention may also exhibit an advantageous effect, as well as the above effects, in the production process of attaching the vent filter to a housing of an electronic device. As described above, the flow path member 2 is held within the hollow portion formed between the adhesive layer 1 and the air-permeable membrane 3, and therefore, the flow path member 2 is not present between the adhesive layer 1 and the air-permeable membrane 3 at the portion of the flange 3a. Accordingly, even if a strong pressing force is applied to the flange 3a when the vent filter is attached to the housing 5, pressure is not transmitted to the flow path member 2. This prevents the flow path member 2 from breaking, and also prevents a ventilation failure from occurring along with the deformation of the flow path 2a.

As described above, the basic constitution of the present invention was shown in Embodiment 1. Variation examples and further improvement examples of the fundamental Embodiment 1 will be shown in Embodiment 2 and thereafter.

(Embodiment 2)

Figure 5:
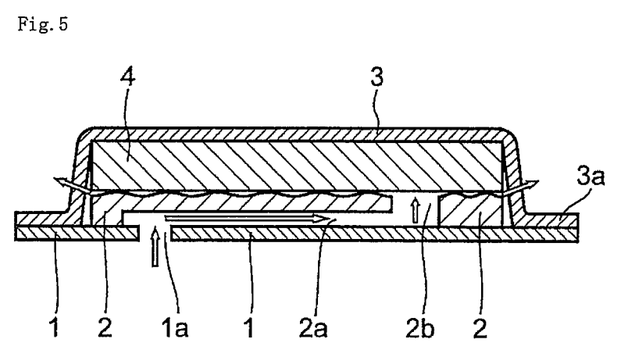
FIG. 5 is a cross-sectional view of a vent filter according to Embodiment 2 of the present invention.

FIG. 5 is a cross-sectional view of a vent filter according to Embodiment 2 of the present invention. In the present Embodiment, the structure is such that among the two front and back main surfaces of the flow path member 2, a second main surface of the flow path member 2, which surface is opposite to the gas adsorbent member 4 (the side opposite to the first main surface opposing the adhesive layer 1) includes concave portions and/or convex portions, whereby ventilation gaps are provided between the flow path member 2 and the gas adsorbent member 4. This is effective for preventing a pressure loss in the vent filter from increasing when the gas adsorbent member 4 has low air permeability. This is also effective from the viewpoint of removing a hazardous gas, because the hazardous gas is adsorbed when air flows along the surface (the lower surface: a first main surface) of the gas adsorbent member 4. To sufficiently exert such an effect, the space formed between the flow path member 2 and the gas adsorbent member 4 by forming the concave portions and/or the convex portions may preferably be not smaller than 0.02 mm$^3$ (preferably not smaller than 0.1 mm$^3$) per 1 mm$^2$ of the flow path member 2. The concave and convex shape of the flow path member 2 can be formed by either injection forming or cutting work. From the viewpoint of production efficiency, it is desirable to use injection forming.

(Embodiment 3)

Figure 6:
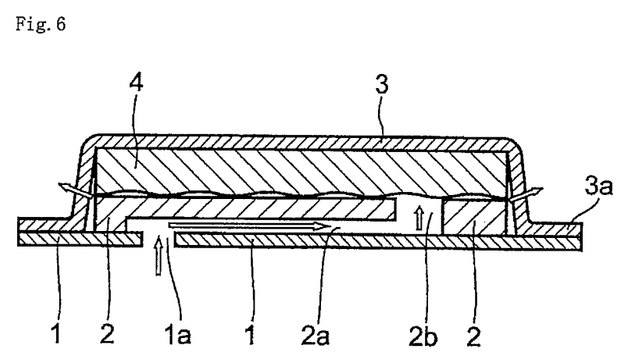
FIG. 6 is a cross-sectional view of a vent filter according to Embodiment 3 of the present invention.

FIG. 6 is a cross-sectional view of a vent filter according to Embodiment 3 of the present invention. In the present Embodiment, the structure is such that among the two front and back main surfaces of the gas adsorbent member 4, the first main surface opposing the flow path member 2 (the side opposite to a second main surface opposing the air-permeable membrane 3) includes concave portions and/or convex portions, whereby ventilation gaps are provided between the flow path member 2 and the gas adsorbent member 4 in a similar manner to Embodiment 2. Similarly to Embodiment 2, this is effective when the gas adsorbent member 4 has a low air permeability. Also in this case, this is effective in view of removing hazardous gas, because hazardous gas is adsorbed when air flows along the surface (the lower surface) of the gas adsorbent member 4. To sufficiently exert such an effect, the space formed between the flow path member 2 and the gas adsorbent member 4 may desirably be set to have a volume of not smaller than 0.02 mm$^3$ (preferably not smaller than 0.1 mm$^3$) per 1 mm$^2$ of the gas adsorbent member 4. It is desirable to use compression forming to form the concave and convex portions in the gas adsorbent member 4.

(Embodiment 4)

Figure 7:
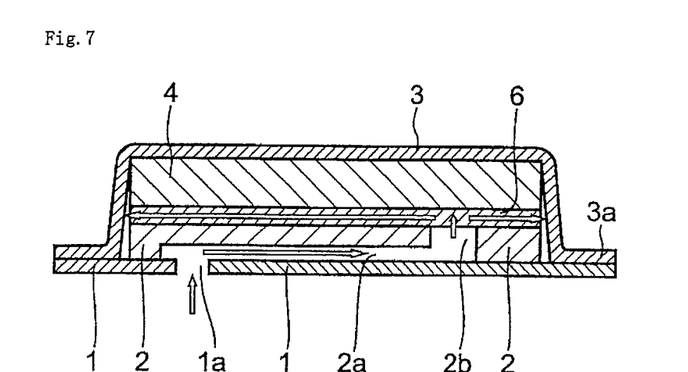
FIG. 7 is a cross-sectional view of a vent filter according to Embodiment 4 of the present invention.

FIG. 7 is a cross-sectional view of a vent filter according to Embodiment 4 of the present invention. In the present Embodiment, the structure is such that an air-permeable member 6 is sandwiched between the flow path member 2 and the gas adsorbent member 4. The air-permeable member 6 is a material capable of securing ventilation gaps, and there can preferably be used nonwoven fabrics or net materials. In this case, the use of a material having filtering properties for the material forming the air-permeable member 6 makes it possible to, when a great amount of dust is generated from the gas adsorbent member 4, prevent the dust from travelling to the flow path 2a and clogging the flow path 2a, or from flowing out of the vent filter. As the specific material having filtering properties, there can be used porous resin films, electret nonwoven fabrics, and nanofiber nonwoven fabrics. Similarly to Embodiments 2 and 3, the vent filter according to Embodiment 4 of the present invention is also effective when the gas adsorbent member 4 has low air permeability, and, as compared with Embodiments 2 and 3, has the advantage of omitting the process of forming concave and convex portions in the flow path member 2 or the gas adsorbent member 4, and also has the advantage of collecting dust before it reaches the air-permeable membrane 3.

(Embodiment 5)

Figure 8:
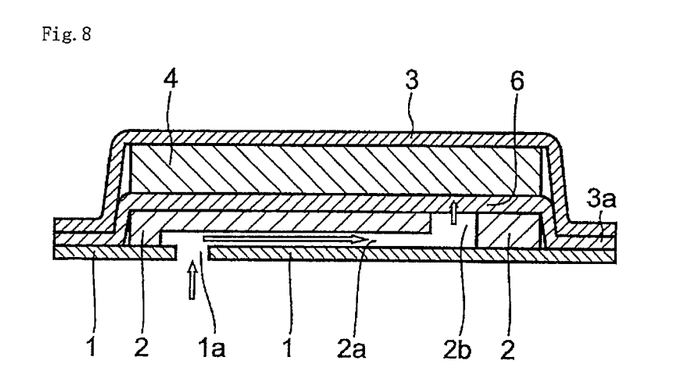
FIG. 8 is a cross-sectional view of a vent filter according to Embodiment 5 of the present invention.

FIG. 8 is a cross-sectional view of a vent filter according to Embodiment 5 of the present invention. The vent filter according to Embodiment 5 has basically the same structure as that of the vent filter according to Embodiment 4, except that the air-permeable member 6 is formed to be wider, and the peripheral portion of the air-permeable member 6 is sandwiched between the air-permeable membrane 3 and the adhesive layer 1 at the peripheral portion (flange 3a) of the air-permeable membrane 3. Such a structure makes it possible to fix the air-permeable member 6 in a stable manner. Further, the distribution of gas toward the inside of the surfaces of the air-permeable member 6 makes it possible to distribute gas also in the portion of the air-permeable member 6 that comes in contact with the flange 3a, and therefore makes it possible to reduce the pressure loss in the vent filter. This is effective when the air permeability of the air-permeable membrane 3 cannot be increased, because the air-permeable membrane 3 requires some degree of strength.

(Embodiment 6)

Figure 9:
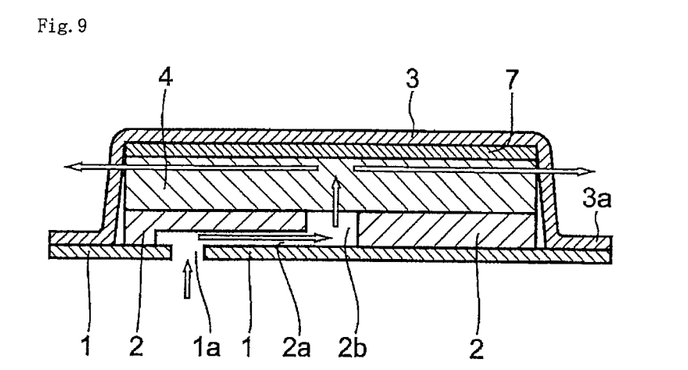
FIG. 9 is a cross-sectional view of a vent filter according to Embodiment 6 of the present invention.

FIG. 9 is a cross-sectional view of a vent filter according to Embodiment 6 of the present invention. In the vent filter according to the present Embodiment, a barrier layer 7, through which gases cannot be allowed to pass, is formed between the gas adsorbent member 4 and the air-permeable membrane 3. The gas flowing into the vent filter through the through-hole 1a will reach the air-permeable membrane 3 through a path having the lowest air-permeability resistance. However, the shorter the distance of the gas passing through the gas adsorbent member 4, the more likely the gas passes through the air-permeable membrane 3 into the housing 5 in the state that hazardous gas is not sufficiently removed from the gas. The barrier layer 7 is effective for allowing gas to traverse the gas adsorbent member 4 through the longest possible path. To sufficiently exhibit such an effect, the opening 2b of the flow path member 2 may preferably be placed at a central portion of the gas adsorbent member 4. This is because gas containing hazardous gas passes through the gas adsorbent member 4 across the distance of at least half the width of the gas adsorbent member 4. In this connection, still another gas adsorbent member may desirably be formed between the barrier layer 7 and the air-permeable membrane 3 in this vent filter. When the barrier layer 7 is provided as shown in FIG. 9, there is deteriorated the performance of adsorbing the gas present within the housing 5 (the upper side in FIG. 9). Thus, the structure may more preferably be such that the barrier layer 7 is sandwiched between two layers of gas adsorbent members including the gas adsorbent member 4 and still another gas adsorbent member.

(Embodiment 7)

Figure 10:
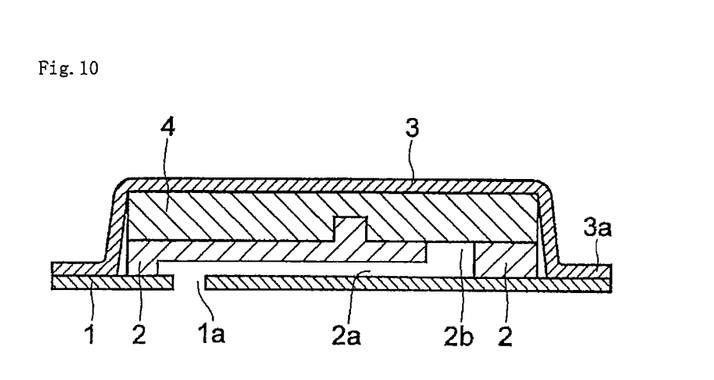
FIG. 10 is a cross-sectional view of a vent filter according to Embodiment 7 of the present invention.

When the gas adsorbent member 4 is used in the above Embodiments 1 to 6, unprecedented problems arise. That is, the flow path member 2 and the gas adsorbent member 4 each has some degree of rigidity, and therefore, if a deviation occurs in the relative positional relationship between the flow path member 2 and the gas adsorbent member 4, the gas adsorption performance of the vent filter may decrease or vary, or the air-permeable membrane 3 may break. To prevent such problems, the'flow path member 2 and the gas adsorbent member 4 may desirably be fixed by providing catching parts in the flow path member 2 and/or the gas adsorbent member 4. The catching parts may be formed by, for example, a method of providing a concave portion or a convex portion in the flow path member 2, and providing a convex portion or a concave portion in the gas adsorbent member 4. FIG. 10 is a cross-sectional view of a vent filter according to Embodiment 7 of the present invention, and shows an example of the case where the flow path member 2 is provided with a convex portion, and the gas adsorbent member 4 is provided with a concave portion. The shape of the convex portion may be set in various forms, such as pillared, conical, pyramidal, and trapezoidal.

Figure 11:
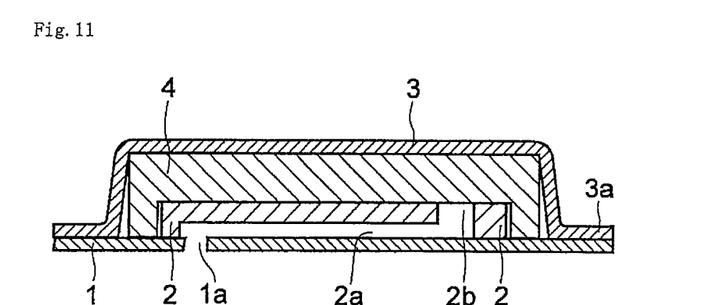
FIG. 11 is a cross-sectional view of another vent filter according to Embodiment 7 of the present invention.

FIG. 11 is a cross-sectional view of another vent filter according to Embodiment 7 of the present invention, and shows an example of the case where a concave portion capable of accommodating the entire flow path member 2 is formed in the gas adsorbent member 4.

As well as the examples of FIGS. 10 and 11, it is also possible to prevent the deviation of the relative positions of the flow path member 2 and the gas adsorbent member 4, so long as the flow path member 2 and the gas adsorbent member 4 are shaped to be engaged together.

In addition, attaching (sticking) the flow path member 2 and the gas adsorbent member 4 together, regardless of whether catching parts are provided or not, is an effective means.

In the Embodiments described above, the vent filter is used for an HDD as an example. The vent filter, however, can be used for not only an HDD but also a housing of any type, so long as it has a housing (container) and needs to reduce the fluctuation of atmospheric pressure (internal pressure) within the housing. The vent filter can also be used for, for example, a variety of control boxes including a computer, and a storage container or a transportation container for chemicals.

REFERENCE EXAMPLE

Figure 12:
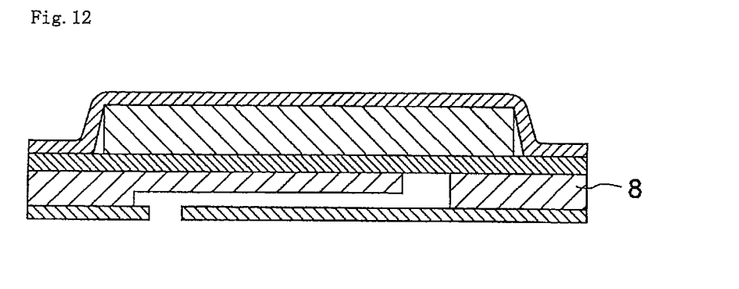
FIG. 12 is a cross-sectional view of a vent filter in Reference Example.

FIG. 12 is a cross-sectional view of a vent filter shown as a reference example. This vent filter has a structure where a gas adsorbent member obtained by encapsulating a gas adsorbent in an expanded porous PTFE membrane formed in a container-like shape is combined by welding with a plastic formed product 8 in which a diffusion flow path is formed. This vent filter has a smaller usage of plastic and a smaller exposed area of plastic than those of the vent filter disclosed in Patent Document 1. The side surfaces of a flow path member, however, are exposed at the surface of the vent filter, and therefore, similarly to the vent filter disclosed in Patent Document 1, weld flash, cutting debris, release agents, or others may scatter in a housing.

Explanation of Numerals
1 Adhesive layer
1a Through-hole
2 Flow path member
2a Flow path
2b Opening
3 Air-permeable membrane
4 Gas adsorbent member
5 Housing
6 Ventilation member
7 Barrier layer
8 Plastic formed product

What is claimed is:

1. A vent filter comprising: an adhesive layer having a through-hole at least in one area; a path flow member provided with a path flow in communication with the through-hole of the adhesive layer; and a air-permeable membrane covering the flow path member and flow path and part of the adhesive layer, wherein the flow path extends between and provides for air flow therethrough between the through-hole of the adhesive layer and the air-permeable membrane, and wherein a peripheral portion of the air-permeable membrane is fixed to a side of the adhesive layer so that the flow path member is held within a hollow portion formed between the adhesive layer and the air permeable membrane and is thereby enclosed on said side of the adhesive layer.

2. The vent filter according to claim 1, wherein the flow path member is a plastic formed product.

3. The vent filter according to claim 1, wherein a groove is formed on a first main surface of the flow path member, which surface is opposite to the adhesive layer, and the groove is a path flow of the path flow member.

4. The vent filter according to claim 1, wherein a gas adsorbent member is formed between the flow path member and the air-permeable membrane.

5. The vent filer according to claim 4, wherein a concave portion and/or a convex portion are formed on a second main surface of the flow path member, which surface is opposite to the gas adsorbent member.

6. The vent filter according to claim 4, wherein a concave portion and/or a convex portion are formed on a first main surface of the gas adsorbent member, which surface is opposite to the path flow member.

7. The vent filter according to claim 4, wherein a ventilation member is sandwiched between the gas adsorbent member and the flow path member.

8. The vent filter according to claim 7, wherein the peripheral portion of the ventilation member is sandwiched between the air-permeable membrane and the adhesive layer in the peripheral portion of the air-permeable membrane.

9. The vent filter according to claim 4, wherein a barrier layer is formed between the gas adsorbent member and the air-permeable membrane.

10. The vent filter according to claim 9, wherein a gas adsorbent member is further formed between the barrier layer and the air-permeable membrane.

11. The vent filter according to claim 1, wherein a catching part is formed in the flow path member and/or the gas adsorbent member.

12. The vent filter according to claim 1, wherein the air permeable membrane comprises a fluororesin membrane.

13. The vent filter according to claim 12, wherein the fluororesin membrane comprises a porous polytetrafluoroethylene membrane.

14. The vent filter according to claim 1, wherein a liquid repellant agent is added to a surface of the air permeable membrane.

15. The vent filter according to claim 1, wherein the adhesive layer comprises a double-sided pressure sensitive adhesive tape.

16. The vent filter according to claim 1, wherein the area for attachment of the peripheral portion of the air permeable membrane to the adhesive layer is not smaller than 0.15 times and not greater than 0.8 times, the bottom area of the vent filter.

17. The vent filer according to claim 1, wherein the flow path member has a thickness of from 0.3 to 5 mm.

18. The vent filter according to claim 5, wherein a space is formed between the flow path member and the gas adsorbent member and the space has a volume of not smaller than 0.02 mm3 per 1 mm3 in area of the main surface of the flow path member.

19. An electric device comprising: a housing having an opening; and the vent filter according to claim 1, which filter is formed so as to cover the opening.

* * * * *